Oct. 15, 1935.  H. HERTZBERG  2,017,246

HOLDER FOR POLISHING SWABS

Filed Nov. 24, 1934

Harry Hertzberg INVENTOR.

BY Martin Jackinson

ATTORNEY

Patented Oct. 15, 1935

2,017,246

UNITED STATES PATENT OFFICE 2,017,246

HOLDER FOR POLISHING SWABS

Harry Hertzberg, New York, N. Y.

Application November 24, 1934, Serial No. 754,597

6 Claims. (Cl. 15—147)

This invention relates to devices for distributing liquid wax upon floors and other flat surfaces, and for polishing the same, and more particularly to a new and improved form of a holder for the polishing swab generally used in such devices.

It is another object of this invention to provide a holder of this kind which is extremely simple in its mechanical construction and which permits the exchange of the spreader therein with facility in a few seconds.

It is another object of the invention to provide a holder of this kind which permits a most economical use of spreader material by using all available parts of the same spreader for distributing floor wax before it is discarded.

It is a further object of this invention to provide a holder in which the spreader may be rigidly attached to the handle perpendicular thereto or may be adjusted to any desired angle therewith to reach otherwise inaccessible places.

These and other objects and advantages of the invention will be apparent from the description thereof to follow taken in connection with the accompanying drawing in which—

Figure 1 is a perspective front view of the wax distributor in rigid position when used for polishing floors and the like.

Figure 2 is a perspective rear view of the same wax distributor in angular position when used for distributing liquid upon a floor.

Figure 3 is a sectional elevation on line 3—3 of Figure 1.

Figures 1, 2, 3:
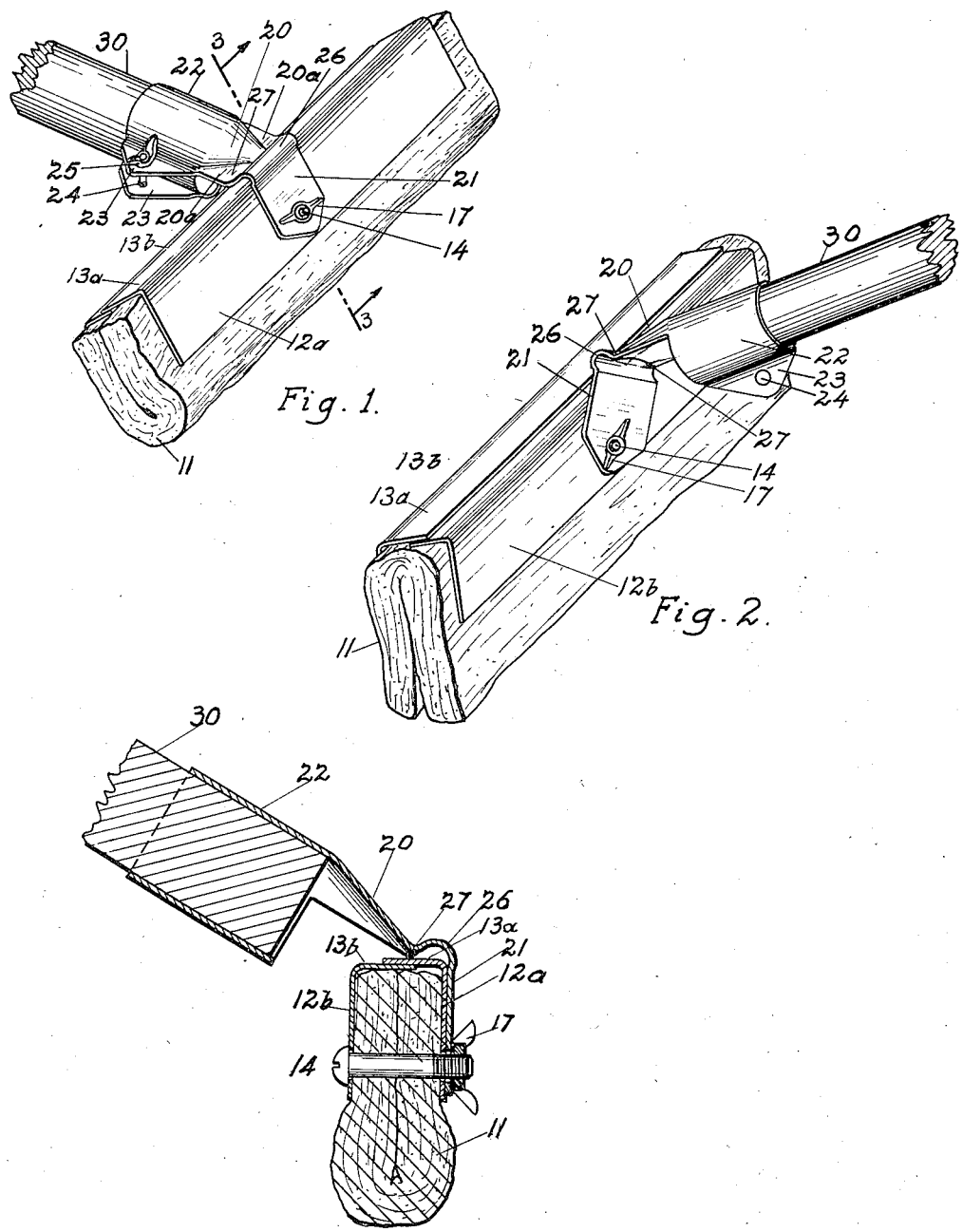

Referring to the drawing, 11 is a rectangular plate of spreading and polishing material preferably of soft felt bent upon itself as shown and held between two parallel plates 12a and 12b, both of which are rectangularly bent lengthwise to provide rear portions 13 adapted to align these plates with each other in operating position on spreader 12. They are clamped upon this spreader by means of a single screw 14 passing through apertures in the center of both plates 12a and 12b of the bent spreader 11 and front plate 21 to which it is clamped by means of wing nut 17. This plate 21 is part of a holder 20 which joins the spreader to a handle bar 30, and it is preferably stamped and formed from a single piece of sheet metal and consists of a cylindrical rear portion 22 adapted to surround the lower end of the mop handle 30 and is provided with two outwardly extending parallel flanges 23 which may be drawn toward each other by a small carriage bolt 24 having its square portion lodged in an aperture of one of said flanges, and a wing nut 25 pressing against the outer face of the other flange. The middle portion 20 of the mop holder consists of the flat plate portion 20a which widens out towards the front of the holder and a conical portion 28 between said plate portions which tapers to a point toward the front. The plate 21 to which the spreader bars 12a and 12b are fastened is a continuation of the side plate 20a and is joined to them by a transverse semicylindrical portion 26 which forms a resilient connection therebetween. When the spreader with the two aligning plates 12a and 12b is attached to the holder 20 as shown in Figures 1 and 3, the ends 27 of plate 20a at their joint with the semicylindrical portion 26 lie against the top face of the upper plate 13a and align it and the spreader to be held rigidly and perpendicularly to the holder 20 and handle 30. When however the lower plate 12b of the spreader is attached to holder 20 as shown in Figure 2 no such alignment takes place, and plate 21 of the holder and the protruding semicylindrical portion 26 are pressed against plate 12b and by the resiliency of this plate may be tightly clamped against this plate by means of wing nut 17 and the spreader may be attached to the holder and handle to form any desired angle therewith.

This novel construction of a wax distributor permits also the use of the spreader plate as shown in Figure 2 with its free ends protruding from the bottom of the plates 12a and 12b for use in distributing liquid wax, and as shown in Figure 1, it exposes a semicylindrical surface for more uniform distribution to avoid streaks in the deposited film of liquid and for polishing the floor surface. When the exposed parts of the spreader material are worn, the plate 11 of spreader material may be turned inside out whereby practically new spreader surfaces are obtained in both positions of the spreader as shown in Figures 1 and 3 as well as in Figure 2.

By this novel construction a very practical and handy distributor for liquids on floors or polishing implement, which to good advantage may also be used for cleaning and polishing windows, is produced. Its simple construction of an extremely small number of parts permits its sale at a very low price and the simplicity of its assembly permits its economical use by any unskilled person.

It will be understood that the form of this improved device shown is for illustration only and that variations in details may be made without departing from the principle of the invention and I desire to be limited only by the state of the prior art and the appended claims.

I claim:

1. In a holder of the kind described, a hollow cylinder adapted to hold a handle, a longitudinal extension on said cylinder, a shelf attached to said extension forming a plane angularly intersecting a continuation of the cylinder axis, a transverse shoulder parallel to said shelf between said extension and shelf, a pair of plates having faces parallel to each other, each plate having a ledge perpendicular to said face and along said face, said ledges being in overlapping relationship to space said plates apart at one longitudinal side, one of said ledges abutting against said shoulder and clamping means extending through said shelf and through the center of both plates holding them transversely perpendicular to the cylinder axis in a plane inclined thereto.

2. In a device of the kind described, a holder of sheet metal adapted for attachment to a handle bar, a plate on said holder inclined to the longitudinal center line of a handle bar held therein and forming a shoulder with said holder parallel to said plate, a pair of angular jaw plates pivotally held on said plate, each having a perpendicular ledge thereon extending longitudinally thereof, said ledges overlapping each other spacing the jaw plates apart on one longitudinal side, the middle portion of one of said ledges abutting against said shoulder forming means to align said jaw plates on said holder transversely perpendicular to the handle thereon and in a plane angularly disposed thereto.

3. In a device of the kind described, a holder of sheet metal adapted for attachment to a handle bar, a plate integral with said holder forming a plane angular to a handle in said holder, a transverse shoulder formed at the junction of said plate and holder and parallel to the plate thereon, an aperture in said plate, a pivot pin passing therethrough and a pair of angular jaw plates on said pivot pin adapted to be held in fixed position by said shoulder when attached on one side of said plate and to be rotatably mounted on said plate when attached to the opposite side thereof and means on said pivot pin to clamp said jaw plates in a fixed perpendicular position or a selective angular position relative to said handle.

4. A swab holder consisting of a handle connecting member and a pair of angular jaw bars each having a clamping leg with a ledge perpendicular thereto and an aperture in the center of said clamping leg, a plate extending forward from said handle connecting member having a perforation therein, a pivot bolt passing through said perforation and through the apertures in said clamping plates which are so placed that said ledges are overlapping and adjacent to each other and form spacing members on the longitudinal edges along one side of said jaw bars to provide a swab holding channel.

5. A holder comprising a connector and adapted for attachment to a handle bar extending longitudinally from one end thereof, a flat perforated plate on said connector joined thereto by a curved resilient portion integral with said plate and said connector, a pair of angle bars forming a pair of jaws, each having a wide leg and narrow leg perpendicular thereto, said narrow legs overlapped to form a swab holding channel, an aperture at the center of each wide leg, a pivot pin passing through the apertures of each wide leg and through the perforation of said plate holding said jaws rotatably on said plate and resilient portion and clamping means on said pivot pin to fasten said jaws in selected angular position to said connector.

6. The combination with a pair of angle bars with one leg of each in overlying contact with a leg of the other to form a channel for receiving swabbing material an opening through the other leg of each bar, a bolt through said openings, of a cylindrical body portion for receiving a handle bar, an integral extension formed on said body portion and disposed axially thereof, an integral plate portion formed at the end of said extension and disposed at an angle thereto, said latter plate being formed with an opening for the reception of said bolt and a wing nut on the end of said bolt for fastening said bars and plate together.

HARRY HERTZBERG.